United States Patent
Li et al.

(10) Patent No.: US 9,893,625 B2
(45) Date of Patent: Feb. 13, 2018

(54) DIRECT CURRENT TO DIRECT CURRENT POWER SUPPLY APPARATUS

(71) Applicant: Delta Electronics (Shanghai) Co., Ltd., Shanghai (CN)

(72) Inventors: Wen-Hua Li, Shanghai (CN); Sheng-Li Lu, Shanghai (CN); Zhong-Wang Yang, Shanghai (CN); Jin-Ying Zhang, Shanghai (CN); Qiong Zhang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 14/662,931

(22) Filed: Mar. 19, 2015

(65) Prior Publication Data
US 2015/0303814 A1 Oct. 22, 2015

(30) Foreign Application Priority Data
Apr. 16, 2014 (CN) .......................... 2014 1 0152880

(51) Int. Cl.
*H02M 3/158* (2006.01)
*H02M 3/335* (2006.01)
(Continued)

(52) U.S. Cl.
CPC ...... *H02M 3/285* (2013.01); *H02M 2001/327* (2013.01)

(58) Field of Classification Search
CPC ....... H02M 2003/1586; H02M 3/1584; H02M 2001/0067; H02M 3/33569;
(Continued)

(56) References Cited

U.S. PATENT DOCUMENTS

| 5,530,635 A * | 6/1996 | Yashiro ..................... H02J 3/01 323/205 |
| 6,014,322 A * | 1/2000 | Higashi ................... H02J 1/102 363/65 |

(Continued)

FOREIGN PATENT DOCUMENTS

| CN | 201430455 Y | 3/2010 |
| CN | 103516176 A | 1/2014 |
| WO | 2009/010476 A1 | 1/2009 |

OTHER PUBLICATIONS

JP 2011-222363A, Kimura Masayoshi, Terminal and Electronic Circuit Component, Apr. 11, 2011.*

(Continued)

*Primary Examiner* — Adolf Berhane
*Assistant Examiner* — Sisay G Tiku
(74) *Attorney, Agent, or Firm* — CKC & Partners Co., Ltd.

(57) ABSTRACT

Disclosed herein is a DC/DC power supply apparatus, which includes a plurality of power boards, a control board and a main board. The plurality of power boards are coupled in parallel with one another, and each power board includes a carrier circuit board and a power device disposed on the carrier circuit board. The control board includes a feedback control circuit and a PWM generator circuit; the feedback control circuit is configured to receive one or more feedback signals from the power boards; the PWM generator circuit outputs a PWM control signal to the power boards based on the feedback signal. The main board is electrically coupled to the power boards and the control board.

18 Claims, 8 Drawing Sheets

(51) Int. Cl.
*H02M 1/00* (2006.01)
*H02M 3/28* (2006.01)
*H02M 1/32* (2007.01)

(58) Field of Classification Search
CPC .......... H02M 3/33576; H02M 3/33523; H05K 1/141–1/145
See application file for complete search history.

(56) References Cited

U.S. PATENT DOCUMENTS

| | | | | |
|---|---|---|---|---|
| 7,068,515 | B2 * | 6/2006 | Harris | H05K 7/1092 165/80.3 |
| 7,467,309 | B2 * | 12/2008 | Templeton | H02J 1/102 713/300 |
| 7,671,490 | B2 * | 3/2010 | Hartung | H02J 1/102 307/113 |
| 7,791,889 | B2 * | 9/2010 | Belady | H01L 23/467 361/694 |
| 7,882,372 | B2 * | 2/2011 | Chapuis | G06F 1/329 323/371 |
| 7,898,111 | B1 * | 3/2011 | Pistel | H02J 1/102 307/82 |
| 9,231,503 | B2 * | 1/2016 | Kemper | H02P 6/002 |
| 2003/0112647 | A1 * | 6/2003 | Liu | H02J 1/102 363/144 |
| 2005/0280997 | A1 * | 12/2005 | Maeda | H01L 23/367 361/703 |
| 2007/0260918 | A1 * | 11/2007 | Okada | G06F 1/30 714/14 |
| 2008/0043405 | A1 * | 2/2008 | Lee | G06F 1/185 361/600 |
| 2008/0238208 | A1 * | 10/2008 | Potter | G06F 1/26 307/75 |
| 2009/0085533 | A1 | 4/2009 | Devine | |
| 2012/0327604 | A1 * | 12/2012 | Yang | H02M 7/003 361/716 |
| 2013/0163297 | A1 * | 6/2013 | Phadke | H02J 3/26 363/65 |
| 2013/0342968 | A1 * | 12/2013 | Peterson | H05K 7/1457 361/622 |
| 2014/0111172 | A1 * | 4/2014 | Sasao | H02M 3/1588 323/271 |
| 2014/0197913 | A1 * | 7/2014 | Ohoka | H01F 27/02 336/92 |
| 2014/0232313 | A1 * | 8/2014 | Nakajima | H05K 7/20927 318/490 |
| 2014/0268947 | A1 * | 9/2014 | Phadke | H02J 1/102 363/69 |
| 2014/0313784 | A1 * | 10/2014 | Strzalkowski | H02M 3/33584 363/17 |
| 2015/0070940 | A1 * | 3/2015 | Sato | H02M 3/1584 363/17 |
| 2015/0207400 | A1 * | 7/2015 | Shenoy | H02M 3/1584 323/213 |
| 2016/0062428 | A1 * | 3/2016 | Zeng | G06F 1/20 713/300 |

OTHER PUBLICATIONS

Wang, Wei-Wei et al., "A Quick Method of Choosing Input Capacitors for CPU Switching Voltage Regulator Down (VRD) Circuit", Telecom Power Technology, vol. 27 No. 1, Jan. 25, 2010.

\* cited by examiner

DIRECT CURRENT TO DIRECT CURRENT POWER SUPPLY APPARATUS

RELATED APPLICATIONS

This application claims priority to Chinese Application Serial Number 201410152880.4, filed Apr. 16, 2014, which is herein incorporated by reference in its entirety.

BACKGROUND

Field of Invention

The present invention relates to a direct current to direct current (DC/DC) power supply apparatus. More particularly, the present invention relates to a DC/DC power supply apparatus.

Description of Related Art

Some of the direct current to direct current (DC/DC) converter modules are suitable for use in the power supply system of apparatus for telecommunication and data communication; such DC/DC converter modules receive the DC voltage from the system and then convert the same into a DC voltage with an appropriate level. Products of this type are often directly mounted on a system board, and are referred to as board mounted power (BMP) modules. As the primary power supply converting unit, such product usually employs a printed circuit board as the transformer winding (also known as PCB winding), in which the power circuit and the control circuit are integrated in a printed circuit board, and hence it possesses higher power density and good heat dissipation efficiency; however, due to the limitation of the height of the system, in most cases, the power produced by a single modules cannot be too great; generally, the power is often dozens to several hundreds of watts.

With the continuous advancement of the apparatus for telecommunication and data communication, the demand for the power of the electricity also increases from several hundreds of watts to several thousands of watts. Conventionally, when a power supply converter with a great power output is desired, a DC/DC converter with a greater power output is used, in which the output levels of the transformer and power device are amplified in proportion to the power ratio; for example, for a system of 1000 watts, a DC/DC converter with a power output of 1000 watts is used. For an apparatus capable of outputting power of several hundreds or even thousands of watts, the transformer are often manufactured using the conventional separate structure; however, such transformer would result in a greater leakage inductance so that the converting efficiency of the transformer is lower than the converting efficiency of the modularized power supply; meanwhile, since a single transformer is used, the size of this transformer is greater, which may affect the design of the wind channel of the power supply system; in particular, in the design where the demand for power density is higher, it is difficult to take into consideration the requirement for heat dissipation, and thus, the solution to this problem is often resolved by increasing the wind flow of the system.

Moreover, since the design of the transformer and power circuit often depends on the power level of the convertor, when the designers face multiple product development projects, they cannot utilize the existing resources, thereby resulting in a great deal of repetitive labor investment and a longer design and development period.

FIG. 1 is an alternative to the above-discussed conventional designs, in which several DC/DC board mounted power modules with smaller power are connected in parallel to fulfill the need for the power supply convertor with a greater power output. For example, for a system with 1000 watts of power, 10 modules with 100 watts of power can be connected in parallel.

Using the DC/DC power supply converter as the board mounted power is advantageous in that the board mounted power can shorten the distance between the product and the load so as to greatly reduce the loss of the connecting line, and hence guarantees the EMI and output index. Further, the product can be ordered depending on the actual need of the load. Moreover, the convertor is an isolation-type product, which can be easily configured in digital or analogous ways. Since the board mounted power module has the advantage of high power density, this solution maintains the advantages of high power density and good heat dissipation efficiency of the DC/DC converter module, thereby providing a reliable power supply. However, in FIG. 1, each board mounted power module has to comprise a power circuit and a corresponding control circuit, so that the control circuit is used to control the power switch of the power circuit; this would result in an increase of the amount of the control circuit in the whole system, thereby causing a drastic increase of the cost of the device. Moreover, the system board may further require a current equalizing circuit or a monitoring circuit to ensure the balance among the plurality of board mounted power modules. Additionally, since the heat dissipation conditions across the system may not be the same, the temperature elevations of various board mounted power modules may be different, and hence the efficiency of each module cannot be maximized, and hence the number of parallel-connected modules is somewhat limited.

In view of the foregoing, there exists a need in the related art for a power supply product with high power density and high efficiency while possessing specific flexibility and compatibility. From the perspective of the design period of the power supply, the skilled artisan also faces the challenge of developing a simpler, more flexible and environmentally-friendly process for manufacturing the power supply product.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In one aspect, the present disclosure provides a DC/DC power supply apparatus to solve aforesaid problems and disadvantages.

The DC/DC power supply apparatus according to embodiments of the present disclosure comprises a plurality of power boards, a control board and a main board. The plurality of power boards are coupled in parallel with one another, and each power board comprises a carrier circuit board and a power device disposed on the carrier circuit board. The control board comprises a feedback control circuit and a PWM generator circuit, in which the feedback control circuit is configured to receive one or more feedback signals from the power boards, and the PWM generator circuit outputs the PWM control signal to the power boards based on the feedback signals. The main board is electrically coupled to the power boards and the control board.

In view of the foregoing, the technical solutions of the present disclosure have advantageous and beneficial effects over the existing techniques. Through the implementation of the above-mentioned technical solutions, the present power supply apparatus has a high power density and high efficiency, and satisfies the need for flexibility and compatibility, and the process for manufacturing the power supply apparatus is simple, flexible and environmentally-friendly.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1:
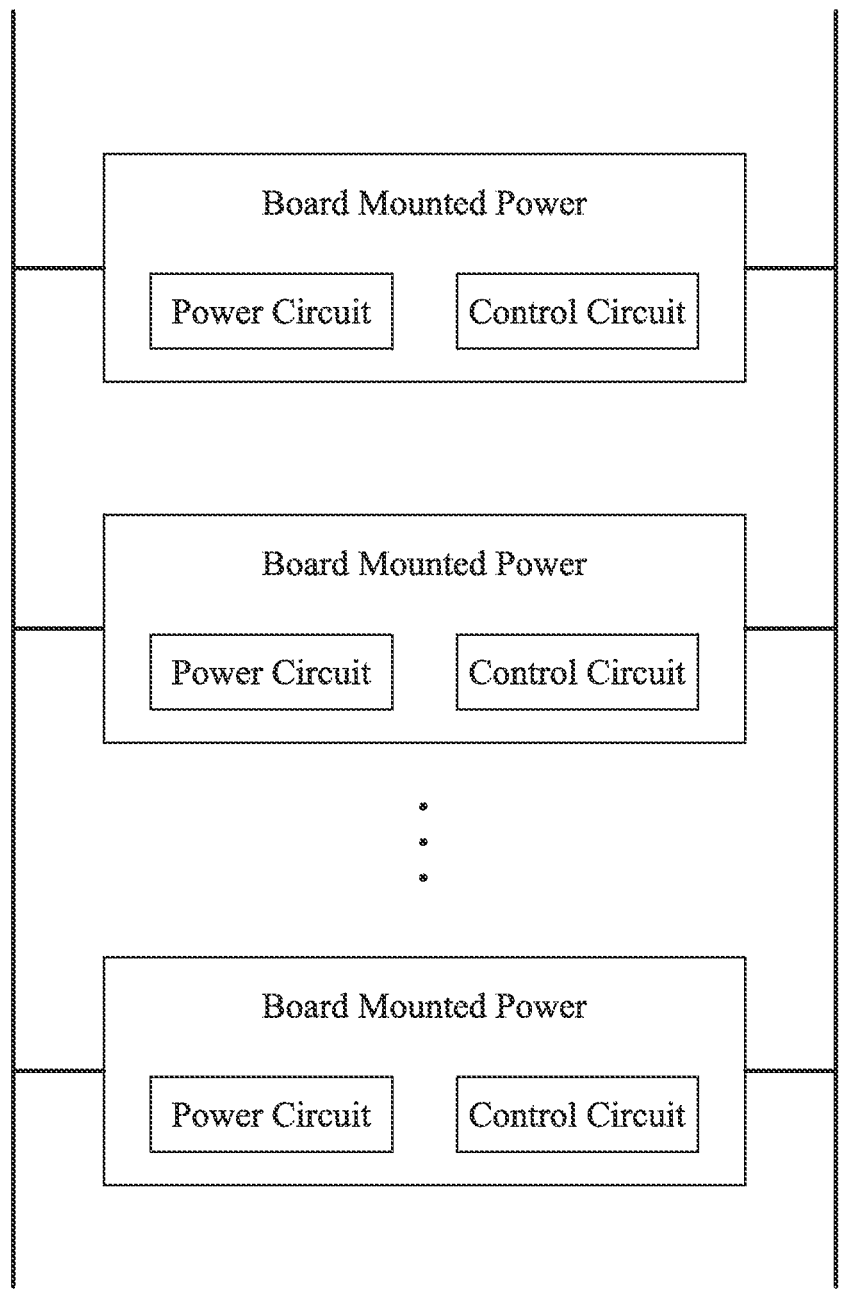
FIG. 1 illustrates a conventional power supply apparatus.

In the following detailed description, for purposes of explanation, numerous specific details are set forth in order to attain a thorough understanding of the disclosed embodiments. In accordance with common practice, like reference numerals and designations in the various drawings are used to indicate like elements/parts. Moreover, well-known elements or method steps are schematically shown or omitted in order to simplify the drawing and to avoid unnecessary limitation to the claimed invention.

Figure 2:
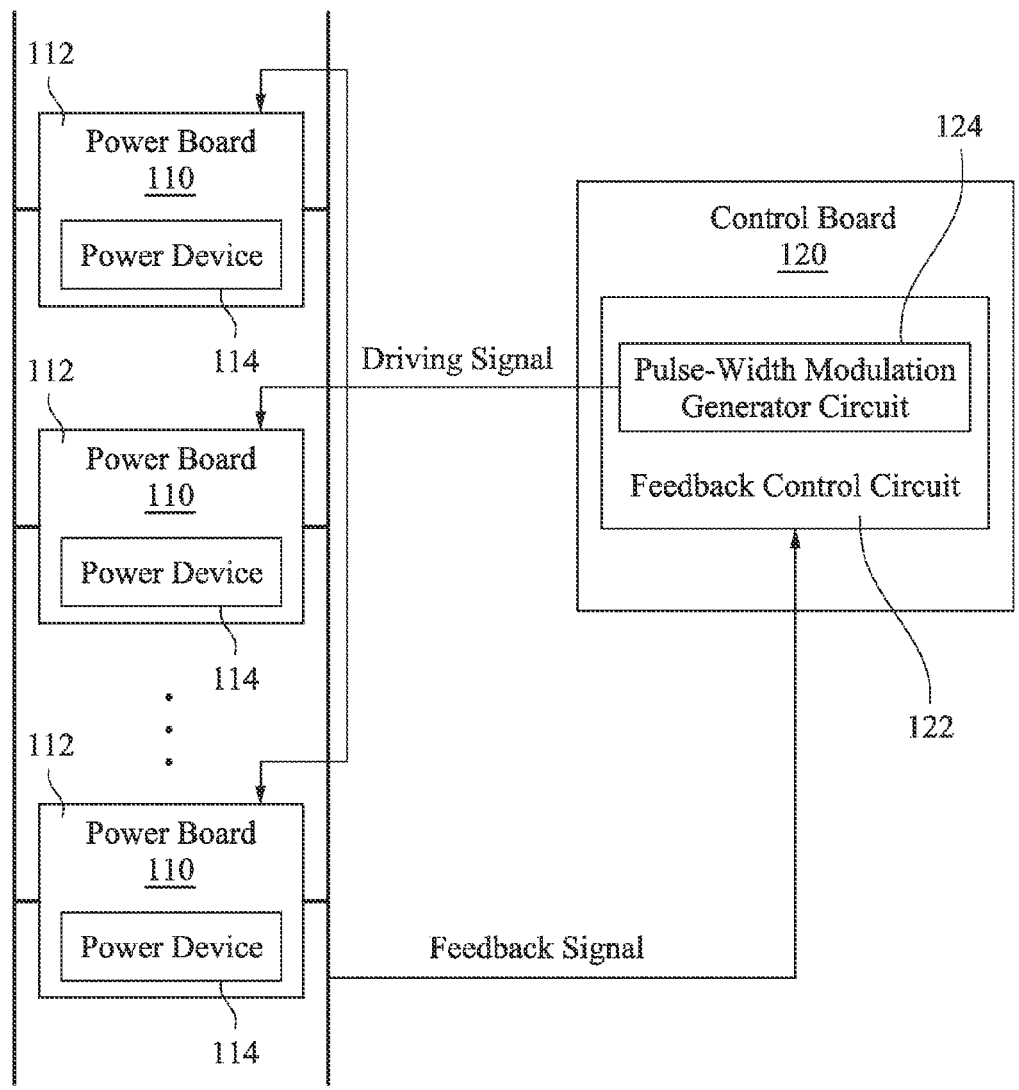
FIG. 2 is a block diagram illustrating a DC/DC power supply apparatus according to one embodiment of the present disclosure.

FIG. 2 is a block diagram illustrating a DC/DC power supply apparatus 100 according to one embodiment of the present disclosure. In the present disclosure, the power circuit and the control circuit of the DC converter are separated from each other. In the power board 110, the power circuit of the original power module mounted thereon is kept, while the control circuit of the original power module mounted thereon is transferred to the control board 120. In this way, the power board can utilize the space of the power module, where is previously occupied by the control circuit, for the design of the power circuit, and hence, the available surface increases by about 20%, compared with the conventional board-mounted power module product, thereby improving the power density of the DC/DC power supply apparatus.

In structure, the plurality of power boards 110 are coupled in parallel with one another, and each power board 110 comprises a carrier circuit board 112 and a power device 114 disposed thereon. The control board 120 comprises a feedback control circuit 122 and a pulse-width modulation (PWM) generator circuit 124. In operation, the control board 120 may perform the overpressure, over-current or overheat protection based on the work state of the power boards 110. Specifically, the feedback control circuit 122 is configured to receive one or more feedback signals (such as, at least one of a voltage signal, a current signal and a temperature signal) from the power boards 110, and the PWM generator circuit 124 outputs a PWM control signal as a driving signal based on the feedback signals and transmitted the driving signal to the power boards 110, so as to control the power device in the power boards 110.

In one embodiment, the driving signal from the PWM generator circuit 124 can be a one-channel signal; that is, a single driving signal is used to universally control each of a plurality of power boards 112. In one embodiment, the driving signal can be a multi-channel signal, in which each driving signal is transmitted to a corresponding power board, so as to individually control the power device of the corresponding power board. As could be easily appreciated, the former uses a single driving signal to embody a simpler and more convenient control strategy; while the later uses a relatively complicated strategy with multiple driving signals, yet it may achieve a more flexible control means.

The above-mentioned strategy that utilizes a plurality of driving signals for one-to-one control can determine the number of power boards to be run based on the load, thereby reducing the loss of the light load or the empty load. Specifically, the PWM generator circuit 124 may selectively output one or more driving signals to some of the plurality of power boards 110 according to the load, so as to shield the remaining power boards and to reduce the loss of the light load and empty load. Assuming that the DC/DC power supply apparatus comprises 10 power boards, and the output power of each power board is 100 watts, if the power required by the load is only 400 watts, the PWM generator circuit on the control board only needs to send 4 driving signals to 4 different power boards, while the remaining 6 power boards are shielded and does not work. When the load power increases, the driving signals corresponding to these shielded power boards are enabled. In one embodiment, when the PWM generator circuit 124 outputs a plurality of driving signals, and uses each driving signal to individually control the corresponding power board 110, the different driving signals may have a phase difference therebetween, and the phase difference is used to reduce the output voltage ripple of the DC/DC power supply apparatus.

Figure 3:
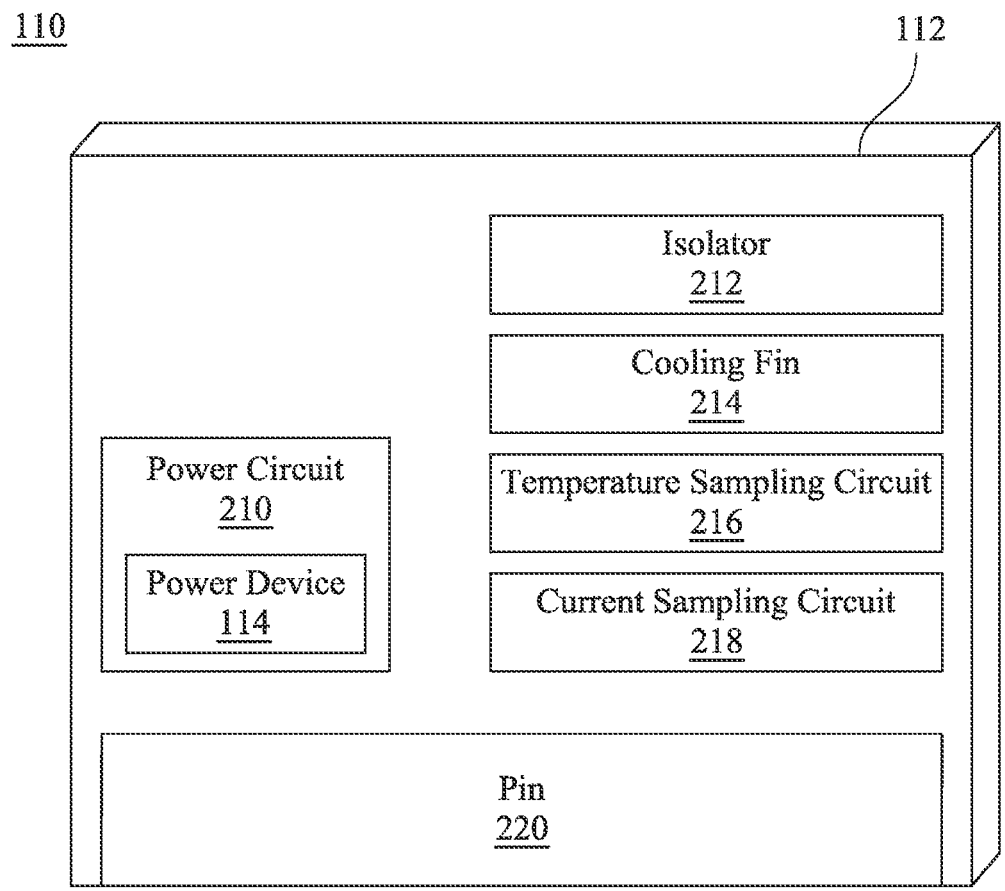
FIG. 3 is a schematic diagram illustrating the structure of a power board according to one embodiment of the present disclosure.

FIG. 3 is a schematic diagram illustrating the structure of a power board 110 according to one embodiment of the present disclosure. The power board 110 comprises a power circuit 210, an isolator 212, a cooling fin 214, a temperature sampling circuit 216 (such as a temperature sensor), a current sampling circuit 218 and a pin 220. The power circuit 210 is configured to transmit the power, and the isolator 212 is often a transformer. The cooling fin 214 can be selectively mounted in adjacent to a component with higher temperature; alternatively, a plurality of cooling fins 214 can be individually mounted in adjacent to different components, or even at both sides or either side of the power boards 110, so as to dissipate the heat of the power device 114 on the power board. The temperature sampling circuit 216 is configured to detect the temperature of the power boards 110, and output a corresponding temperature signal to the control board 120. The current sampling circuit 218 is configured to sample the output current of the power boards 110. The pin 220 is electrically coupled to the main board. In one embodiment, the pins 220 of the power boards 110 are arranged in a single in-line package. As could be appreciated by ordinary skill in the art, the power boards illustrated in FIG. 3 is only an exemplary structure according to the present disclosure; however, the present invention is not limited thereto. In other embodiments, the power board may only comprise the current sampling circuit. In some other embodiments, the power boards may comprise the current sampling circuit and the temperature sampling circuit.

Figure 4:
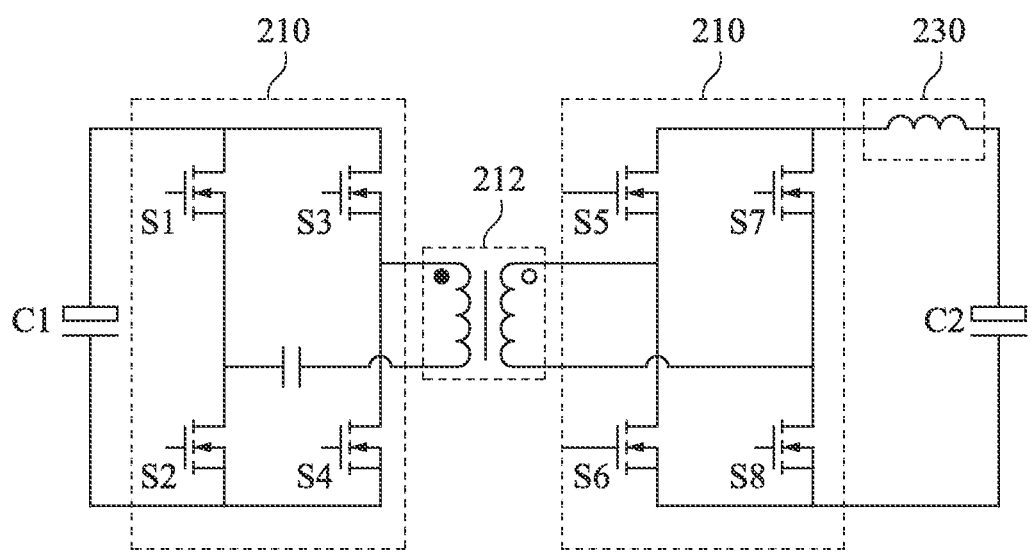
FIG. 4 is a topology structure diagram illustrating the circuit of a power board according to one embodiment of the present disclosure.

FIG. 4 is a topology structure diagram illustrating the circuit of a power board according to one embodiment of the present disclosure. As illustrated in FIG. 4, the isolated converter 200 comprises a power circuit 210, an isolated transformer 212, capacitors C1 and C2, and an inductor 230. The power circuit 210 comprises power switches S1-S4 disposed at the primary side of the isolated converter 212 and power switches S5-S8 disposed at the secondary side of the isolated converter 212. The inductor 230 may be an output inductor. The capacitor C2 may be an output capacitor. Moreover, the power switches S1-S8 and the capacitors C1 and C2 are welded on the carrier circuit board 112 (illustrated in FIG. 3) using surface mount technique (SMT).

In alternative embodiments, said isolated converter may only comprise the power circuit 210 and the isolated transformer 212. The inductor 230 and the capacitors C1 and C2 are disposed on the main board 100. In this way, one end of the inductor 230 on the main board 130 is electrically connected to the power circuit at the secondary side of isolated transformer 212 on the power boards 200, while the other end of the inductor 230 is electrically connected to the capacitor C2.

Figure 5:
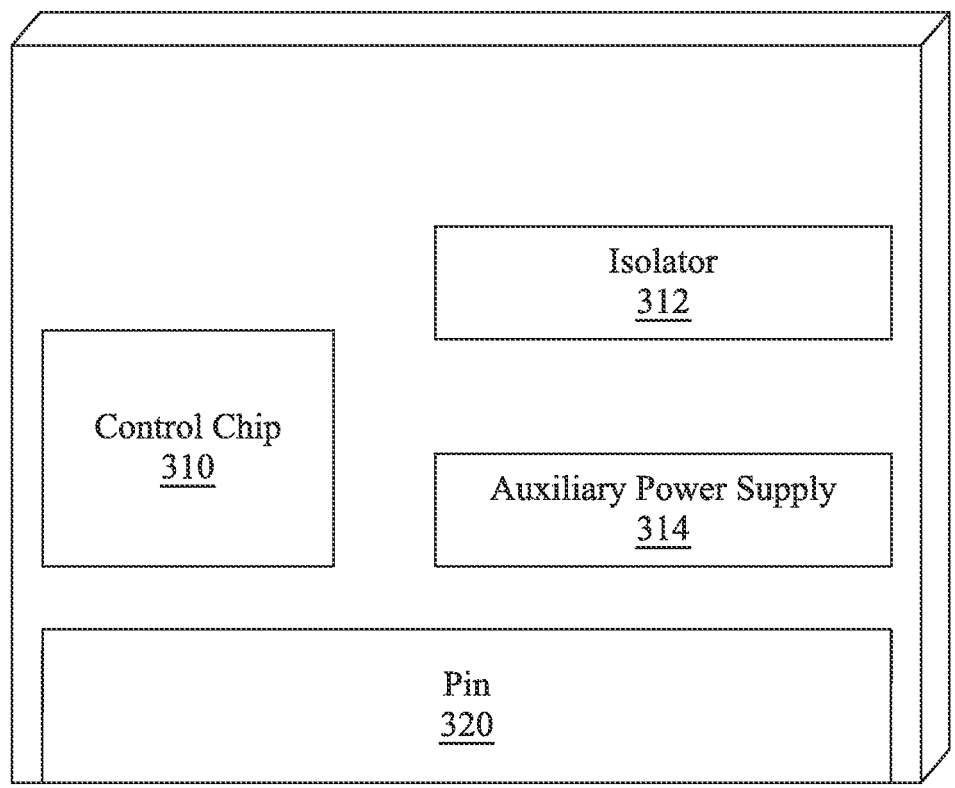
FIG. 5 is a schematic diagram illustrating the structure of a control board according to one embodiment of the present disclosure.

FIG. 5 is a schematic diagram illustrating the structure of a control board 120 according to one embodiment of the present disclosure. In addition to the PWM generator circuit 124 and the feedback control circuit 122 that are illustrated in FIG. 1, the , control board 120 in FIG. 5 further comprises a control chip 310. Moreover, the pins 320 are used as a communication interface, which is configured to transmit the work state information of the control board 120 and/or the power board 110, and receive an external control command. Also it may further provide communication functionality, for example, read work state information of the control board 120 and the power board 110 from outside, and control the operation of the control board 120 and the power board 110.

Additionally, the control board 120 further comprises an isolator 312.

Referring to FIGS. 1, 4 and 5 at the same time, the PWM generator circuit 124 generates two mutually isolated driving signals via the isolator 312, so as to individually control the power switches S1-S4 at the primary side of the transformer 212 and the power switches S5-S8 at the secondary side of the transformer 212. The DC/DC power supply apparatus further comprises an auxiliary power supply 314, which is disposed on the control board 120 or the main board 130, and is configured to supply power to the control board 120.

Figure 6:
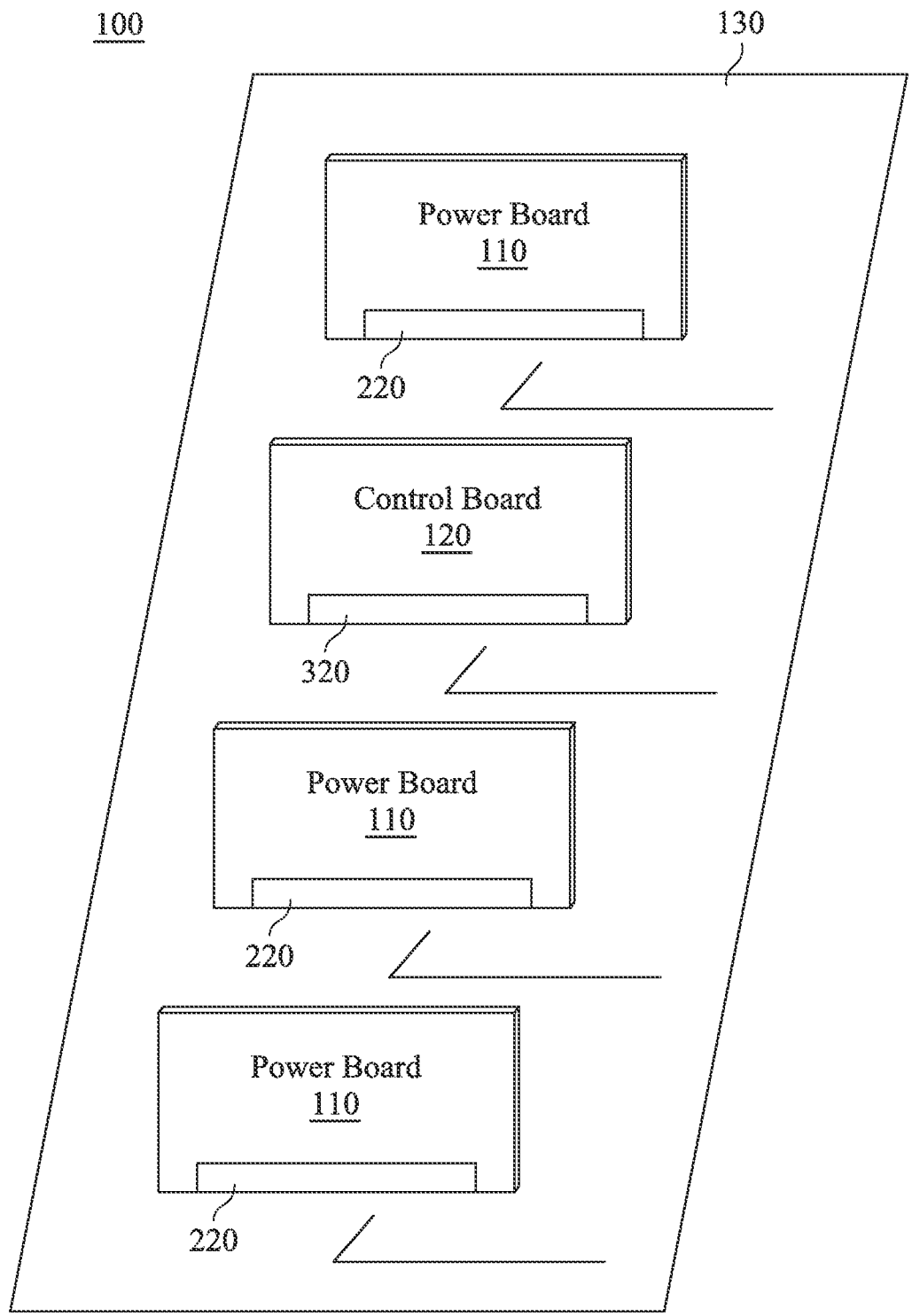
FIG. 6 is a schematic diagram illustrating the wind channel according to one embodiment of the present disclosure.

FIG. 6 is a schematic diagram illustrating the wind channel according to one embodiment of the present disclosure. As illustrated in FIG. 6, the main board 130 is electrically connected to the power boards 110 and the control board 120. To be distinguished from a DC converter with a greater power output, each power board 110 according to the present disclosure comprises a smaller transformer (such as the transformer 212 in FIG. 4), which can avoid loss of the leakage inductance; further, the heat sources are distributed across the whole DC converter; moreover, since the power boards 110 and the control board 120 can be mounted horizontally or vertically, using the single in-line package pins 220, 320 for fixation, the naturally formed wind channels may facilitate the heat dissipation, and the above-mentioned structure is also advantageous for the wind channel design of the power supply system (as illustrated in FIG. 6). In contrast, conventional board mounted power modules only allow for heat dissipation from a single surface, and hence the important components can only be arranged on a single surface, thereby limiting the flexibility of the product design. In particular, in higher power density demand, the present disclosure is more advantageous for optimizing the heat dissipation efficiency of the system.

Figure 7:
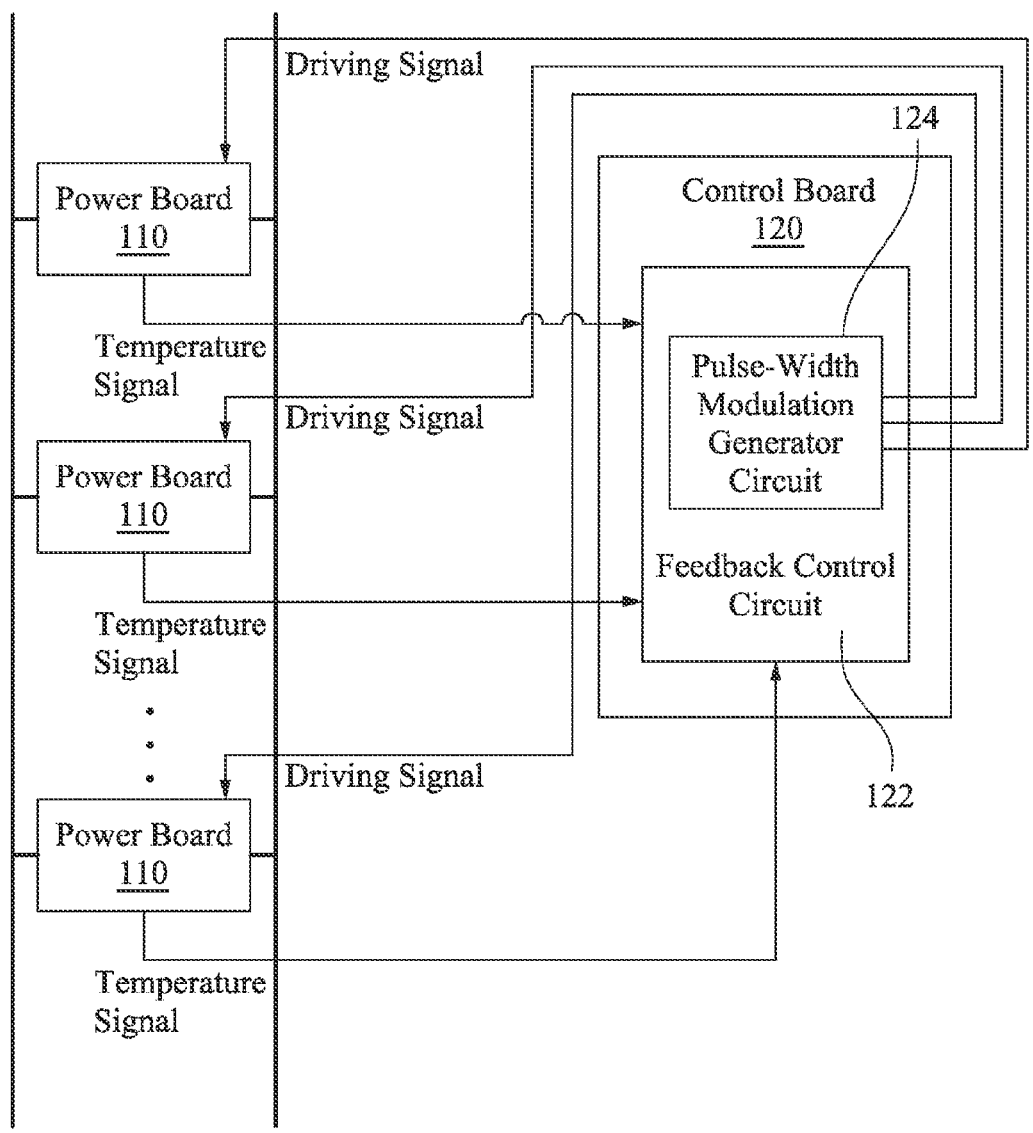
FIG. 7 is a schematic diagram illustrating the temperature detection of a DC/DC power supply apparatus according to one embodiment of the present disclosure.

As could be appreciated, a plurality of board-mounted power module in parallel output power, the outputted power is usually restricted to some extent. For example, when two board-mounted power modules with the same power are connected in parallel, assuming they are disposed in different heat dissipation environments, and one power module locates at a position with smaller wind flow, the heat dissipation condition of such module is poorer, and it may reach the over-heat temperature before it reaches the rated power. In a parallel-connection system, the output current of each board-mounted power is the same with one another, and hence, the output power of the whole parallel-connected system is limited by the board-mounted power located in the environment with the poorer heat dissipation condition, and thus, the system cannot reach the rated maximum output power. To address the above-mentioned problems associated with board-mounted power modules, refer to FIG. 7, which is a schematic diagram illustrating the temperature detection of a DC/DC power supply apparatus according to one embodiment of the present disclosure. In the present disclosure, the PWM generator circuit 124 can output a single driving signal based on the temperature signal, so that a single driving signal is used to control each power board 110 and fulfill the purpose of over-heat protection; the PWM generator circuit 124 can also output a plurality of driving signals based on the temperature signals, so that each driving signal is used to individually control a corresponding power board 110 thereby adjusting and balancing the temperatures of the plurality of power boards 110. In the above-mentioned situation, when a plurality of power boards are parallelly connected, and the control circuit detects that the temperatures of power boards differ from one another significantly based on the temperature signals, the PWM generator circuit 124 would send a specific driving signal to increase the output current of the power board located in an environment with a better heat dissipation condition so as to increase the output power thereof. In view of the foregoing, the present disclosure utilizes individual driving signals to adjust the temperature balance among different power boards, and change the power partition among power boards, so that the DC converter may output the maximum power.

As discussed hereinabove, according to the conventional art, the design of the transformer and power circuit depends on the power of the converter, and hence, designers cannot utilize the existing resources when facing multiple product design projects, thereby resulting in a great deal of repetitive labor investment and a longer design and development period. To satisfy the demands for different loads, the present disclosure provides a structure of a control board 120 pluses a plurality of power boards 110, wherein the power boards of any numbers are connected in parallel to satisfy the power demand of the DC converter. For example, the DC converter with 400 watts output power may be comprised of one control board 120 and four power boards, and each power board outputs 100 watts. Similarly, the DC converter with 600 watts output power may be comprised of one control board 120 and six power boards, and each power board outputs 100 watts. In addition, the DC converter with 800 watts output power may be comprised of one control board 120 and four power boards, and each power board outputs 200 watts. In this way, even a DC converter with a greater power output can be also conveniently constructed to fulfill the demand of different loads. Of course, the present disclosure can also provide a DC converter comprising a control board 120 and six power boards 110. When the demand of the load is 400 watts, the control board 120 outputs four driving signals to four of the six power boards, so that the output power of the DC converter is 400 watts; in this case, the other two power boards are shielded to reduce the light load loss. Moreover, the selected four driving signal may correspond to any four of the six power boards, and when one of the four power boards fails to work, another power board can be used to replace the malfunctioned one, so as to accomplish the redundant functionality among the power boards. When the power demand of the load is 600 watts, the control board 120 outputs six driving signals to all of the six power boards, so that the output power of the DC convertor is 600 watts.

Further, the power boards 110 of various power levels and control board 120 with different functionality can be manufactured in the factory using the standardized protocol, and when designing the DC modules, the designers can simply combine suitable numbers of standardized power boards 110 and control board 120; for example, for DC convertors with the same output power but different functions, the designers only needs to design a new control board 120 pursuant to the required function, and don't have to replace the power boards 110; in this way, it is not necessary to design the product de novo, like the conventional art, and therefore, the time for design and development is reduced and the design and development period of the project is shorten.

Figure 8:
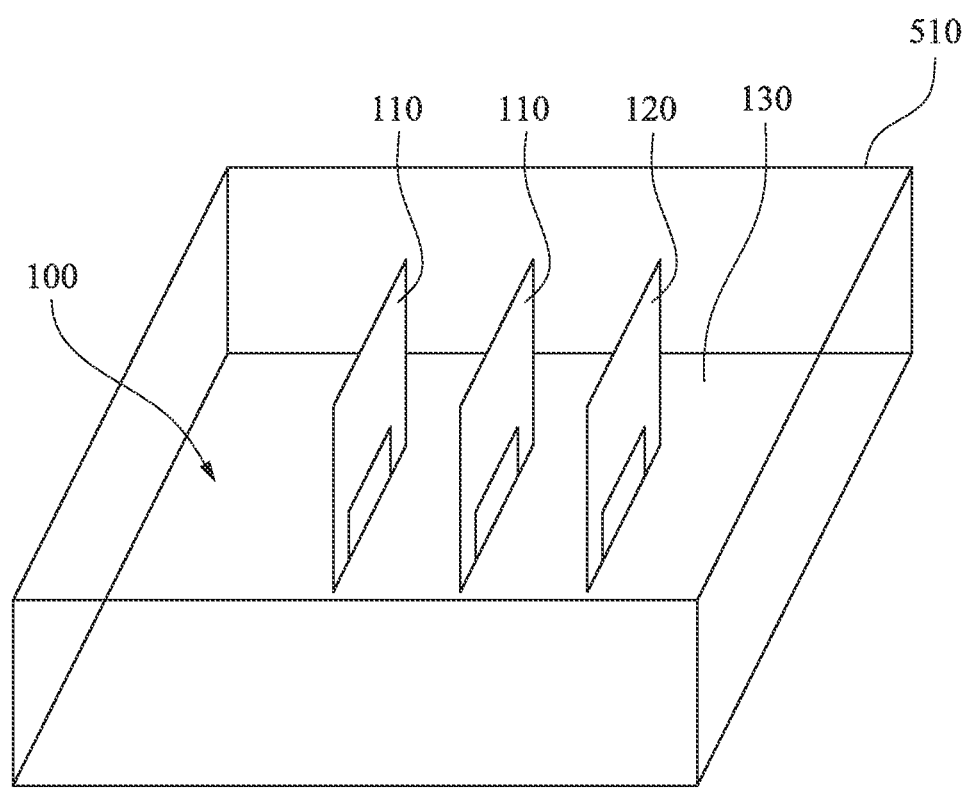
FIG. 8 is a schematic diagram illustrating the structure of a DC/DC power supply apparatus with a casing according to another embodiment of the present disclosure.

FIG. 8 is a schematic diagram illustrating the structure of a DC/DC power supply apparatus 100 with a housing case 510 according to another embodiment of the present disclosure. As illustrated, the power boards 110 and the control board 120 are vertically mounted on the main board 130, the DC/DC power supply apparatus 100 is encapsulated in the housing case 510; in comparison to conventional products of board-mounted power modules, the present DC/DC power supply apparatus 100 is advantageous in its low manufacturing cost. As could be appreciated, the multiple control circuits used in the conventional art is reduced to one control circuit in the present disclosure, and hence the number of the components of the whole DC converter is reduced, thereby resulting a lower cost. Another reason for the reduced cost is that the board-mounted power modules are generally made of multilayer board, while the power board 110 is made of double-layer board, and the price of the former is higher than that of the latter one. The greater the power of the DC convertor, the more the number of parallel-connected power boards, and hence, the cost advantage is more substantial.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:

1. A direct current to direct current (DC/DC) power supply apparatus, comprising:
   a plurality of power boards coupled in parallel with one another, wherein each power board comprises a carrier circuit board and a power device disposed on the carrier circuit board, wherein the power device comprises a power circuit and a transformer, wherein the power circuit comprises a plurality of power switches disposed at a primary side and a secondary side of the transformer for controlling the transformer;
   a control board electrically coupled to the power boards and comprising a feedback control circuit and a pulse width modulation (PWM) generator circuit, wherein the feedback control circuit is configured to receive one or more feedback signals from the power boards, and the PWM generator circuit outputs a PWM driving control signal to the power boards to drive the plurality of power switches based on the feedback signals; and
   a main board electrically coupled to the power boards and the control board,
   wherein the power boards and the control board are vertically mounted on the main board and physically separated from each other.

2. The DC/DC power supply apparatus of claim 1, wherein the feedback signal is at least one of a voltage signal, a current signal and a temperature signal.

3. The DC/DC power supply apparatus of claim 1, wherein each of the power boards further comprises a temperature sampling circuit configured to detect the temperature of the power boards, and output a corresponding temperature signal to the control board.

4. The DC/DC power supply apparatus of claim 3, wherein the PWM generator circuit outputs single PWM control signal based on the temperature signal, so as to control each of the plurality of power boards.

5. The DC/DC power supply apparatus of claim 3, wherein the PWM generator circuit outputs a plurality of PWM control signals based on the temperature signal, wherein each PWM control signal individually controls the corresponding power board, so as to adjust the temperatures of the plurality of power boards and achieve a temperature balance.

6. The DC/DC power supply apparatus of claim 1, wherein the PWM generator circuit outputs one or more PWM control signals to some power boards of the plurality of power boards according to the load of the DC/DC power supply apparatus, so as to reduce the loss under light load and empty load.

7. The DC/DC power supply apparatus of claim 1, wherein the PWM generator circuit outputs single PWM control signal, so as to control each of the plurality of power boards.

8. The DC/DC power supply apparatus of claim 1, wherein the PWM generator circuit outputs a plurality of PWM control signals, wherein each PWM control signal individually controls the corresponding power board.

9. The DC/DC power supply apparatus of claim 8, wherein the different PWM control signals have a phase difference therebetween, and the phase difference is used to reduce the output voltage ripple of the DC/DC power supply apparatus.

10. The DC/DC power supply apparatus of claim 1, wherein the control board further comprises a communication interface configured to transmit a work state information of the control board and/or the power boards, and receive an external control command.

11. The DC/DC power supply apparatus of claim 1, wherein the power boards further comprises a current sampling circuit configured to sample the output current of the power boards.

12. The DC/DC power supply apparatus of claim 1, wherein the power boards comprises an isolated converter, wherein the isolated converter has a transformer, a power switch, a capacitor and an inductor, wherein the power switch and the capacitor are welded on the carrier circuit board via a surface mount technique (SMT) process.

13. The DC/DC power supply apparatus of claim 12, wherein the control board further comprises an isolator, and the PWM generator circuit generates two mutually-isolated PWM control signals via the isolator, so as to respectively control the power switch at the primary side and the power switch at the secondary side.

14. The DC/DC power supply apparatus of claim 1, wherein
the power boards comprises an isolated converter, which comprises a transformer, a primary circuit disposed at the primary side of the transformer, and a secondary circuit disposed at the secondary side of the transformer; and
the main board comprises an inductor and a capacitor, wherein one end of the inductor is electrically coupled to the output of the secondary circuit, and the other end of the inductor is electrically coupled to the capacitor.

15. The DC/DC power supply apparatus of claim 1, further comprising an auxiliary power supply, which is disposed on the control board or the main board, and is configured to supply power to the control board.

16. The DC/DC power supply apparatus of claim 1, wherein each of the power boards further comprises a cooling fin configured to dissipate the power devices on the power boards.

17. The DC/DC power supply apparatus of claim 1, wherein the pins of the power boards are arranged in a single in-line package.

18. The DC/DC power supply apparatus of claim 1, wherein the DC/DC power supply apparatus is packaged in a housing case.

* * * * *